United States Patent [19]

Vandenbulcke et al.

[11] Patent Number: 5,194,330

[45] Date of Patent: Mar. 16, 1993

[54] METHOD OF PROVIDING ANTI-OXIDATION PROTECTION FOR A COMPOSITE MATERIAL CONTAINING CARBON, AND A MATERIAL PROTECTED THEREBY

[75] Inventors: Lionel Vandenbulcke, Saint Jean le Blanc; Stephane Goujard, Merignac; Henri Tawil, Le Bouscat; Jean-Claude Cavalier, Le Pain Medoc, all of France

[73] Assignee: Societe Europeenne de Propulsion, Suresness, France

[21] Appl. No.: 782,585

[22] Filed: Oct. 25, 1991

[30] Foreign Application Priority Data

Oct. 26, 1990 [FR] France .................. 90 13319

[51] Int. Cl.⁵ ............................. B32B 18/00
[52] U.S. Cl. ................... 428/336; 428/378; 428/380; 428/384; 428/403; 428/404; 428/408; 428/698; 428/704; 252/502; 252/504; 252/506
[58] Field of Search ........... 428/408, 688, 704, 378, 428/379, 380, 403, 404, 698, 384, 336; 427/249; 252/502, 504, 506

[56] References Cited

U.S. PATENT DOCUMENTS

| | | | |
|---|---|---|---|
| 4,268,582 | 5/1981 | Hale et al. | 428/698 |
| 4,425,407 | 1/1984 | Galasso et al. | 428/368 |
| 4,476,164 | 10/1984 | Veltri et al. | 427/249 |
| 4,476,178 | 10/1984 | Veltri et al. | 428/215 |
| 4,481,257 | 11/1984 | Suplinskas et al. | 428/366 |
| 4,668,579 | 5/1987 | Strangman et al. | 428/367 |
| 4,752,503 | 6/1988 | Thebault | 427/248.1 |
| 4,863,798 | 9/1989 | Arenz et al. | 428/368 |
| 4,868,056 | 9/1989 | Haselkorn | 428/408 |
| 5,051,300 | 9/1991 | Rousseau et al. | 428/365 |
| 5,079,195 | 1/1992 | Chiang et al. | 428/698 |

FOREIGN PATENT DOCUMENTS

| | | |
|---|---|---|
| 0085601 | 8/1983 | European Pat. Off. |
| 0176055 | 4/1986 | European Pat. Off. |
| 936738 | 3/1956 | Fed. Rep. of Germany |
| 2189207 | 1/1974 | France |
| 2401888 | 3/1979 | France |

OTHER PUBLICATIONS

Patent Abstracts of Japan, vol. 14, No. 290 (C-731) (4233), 22 Jun. 1990, & JP-A2 91270 (Kawasaki Steel Corp.) 30 Mar. 1990.

*Primary Examiner*—Ellis P. Robinson
*Assistant Examiner*—Timothy M. Speer
*Attorney, Agent, or Firm*—Weingarten, Schurgin, Gagnebin & Hayes

[57] ABSTRACT

A composite material containing carbon is protected against oxidation by forming, on the composite material, an inner layer, an intermediate layer containing boron or a boron compound, and an outer layer of silicon carbide. The inner layer formed on the composite material before the intermediate layer is formed, is made of a refractory carbide that does not contain boron and that is at least 60 microns thick, said inner layer insulating the intermediate layer from the carbon contained in the composite material.

4 Claims, 6 Drawing Sheets

Cyclic oxidation at 850°C in air on 3D C/C

- I   SiC (120μ)+B₄C(10μ)+SiC(60μ)
- II  SiC (120μ)+B₄C(40μ)+SiC(60μ)
- III SiC (60μ)+B₄C(10μ)+SiC(60μ)
- IV  B₄C(60μ)+SiC(60μ)
- V   B₄C(20μ)+SiC(80μ)

FIG. 2 Cyclic oxidation at 850°C in air on 3D C/C

I   SiC (120μ) + $B_4C$ (10μ) + SiC (60μ)
II  SiC (120μ) + $B_4C$ (40μ) + SiC (60μ)
III SiC (60μ) + $B_4C$ (10μ) + SiC (60μ)
IV  $B_4C$ (60μ) + SiC (60μ)
V   $B_4C$ (20μ) + SiC (80μ)

FIG. 3 Cyclic oxidation at 1300°C in air on 3D C/C

VI  SiC (120μ) + $B_4C$ (10μ) + SiC (60μ)
VII  SiC (120μ) + $B_4C$ (5μ) + SiC (30μ)
VIII  SiC (60μ) + $B_4C$ (10μ) + SiC (60μ)
IX  SiC (30μ) + $B_4C$ (5μ) + SiC (30μ)
X  $B_4C$ (60μ) + SiC (60μ)
XI  $B_4C$ (20μ) + SiC (80μ)
XII  SiC (120μ)

FIG. 4 Cyclic oxidation at 1500°C in air on 3D C/C

XIII  SiC (120μ) + B₄C (10μ) + SiC (60μ)
XIV   SiC (120μ) + B₄C (40μ) + SiC (60μ)
XV    SiC (160μ)
XX    SiC (120μ) + B (8μ) + SiC (60μ)

FIG.5 Cyclic oxidation in air on 3D C/C
coating SiC (120μ) + B₄C (40μ) + SiC (60μ)

XVI : at 450°C
XVII : at 850°C
XVIII : at 1300°C
XIX : at 1500°C (a) Isothermal oxidation at 1300°C
(b) Isothermal oxidation at 1500°C
(c) Prestress of 80 MPa on one face and isothermal oxidation at 1300°C
(d) Isothermal oxidation at 1500°C
(e) Prestress of 80 MPa on other face and isothermal oxidation at 1500°C XXI  3D C/C  SiC(120μ) + B(8μ) + SiC(60μ)
XXII 3D C/C  SiC(120μ) + B(4μ) + SiC(30μ)

METHOD OF PROVIDING ANTI-OXIDATION PROTECTION FOR A COMPOSITE MATERIAL CONTAINING CARBON, AND A MATERIAL PROTECTED THEREBY

The present invention relates to protecting carbon-containing composite materials from oxidation, in particular thermostructural composite materials.

BACKGROUND OF THE INVENTION

Thermostructural composite materials are formed by a fibrous reinforcing texture constituted by refractory fibers and densified by a matrix that is also made of refractory material. They are characterized by mechanical properties that make them suitable for constituting structural components, and by the ability to retain these mechanical properties at high temperatures. These materials are used, in particular, in space and in aeronautics.

The material constituting the fibers in the reinforcing texture is generally carbon or a ceramic such as silicon carbide (SiC).

Similarly, the material constituting the matrix is generally carbon or a ceramic such as silicon carbide.

The matrix is formed in conventional manner by a liquid impregnation or by a chemical vapor infiltration technique.

In the liquid impregnation, the fibrous texture is impregnated with a precursor for the matrix, e.g. a resin, and is then subjected to heat treatment such that the matrix material is obtained by transformation of the precursor. Series of successive steps of impregnation and heat treatment cycles may be achieved.

In the chemical vapor infiltration technique, the fibrous texture is placed in an enclosure into which a gas is admitted that decomposes or reacts under particular conditions of temperature and pressure to form a deposit on the fibers of the texture, throughout the volume thereof. Typical chemical vapor infiltration methods for materials such as carbon or ceramics (e.g. silicon carbide or a refractory oxide such as alumina or zirconia) are well known. Reference may be made in particular to the following documents: FR-A-2 189 207, FR-A-2 401 888, and EP-A-0 085 601.

Hence, the usual thermostructural composite materials are carbon/carbon (C/C) materials, carbon/ceramic (C/ceramic) materials, and ceramic/ceramic materials.

With ceramic/ceramic materials, e.g. SiC/SiC, it is known that an interphase layer may be interposed between the fibers and the matrix to improve the mechanical behavior of the material. As described in U.S. Pat. No. 4,752,503, the interphase is constituted by boron nitride or by pyrolytic carbon.

Thus, in most cases thermostructural composite materials contain some carbon, be it in the reinforcing fibers, in the matrix, or in an interphase between the fibers and the matrix.

For high temperature applications, it is therefore essential to protect the material to avoid it being degraded by the effect of carbon disappearing due to oxidation.

There are numerous techniques in the state of the art for providing anti-oxidation protection for composite materials containing carbon. The techniques used often coat the outside of the composite material with a layer that constitutes an oxygen barrier, typically a layer of silicon carbide. That protection is commonly supplemented by depositing material that constitutes (or is suitable for constituting at high temperature) a borate, a silicate, or a boro-silicate type glass having healing properties relative to cracks that may appear in the silicon carbide coating.

Examples illustrating the state of the art can be found by referring to U.S. Pat. No. 4,668,579 and European Patent Application No. 0 176 055.

In U.S. Pat. No. 4,668,579 (inventors Strangman, et al.,) a C/C composite material is protected against oxidation by forming at least one protective layer comprising an internal portion of boron carbide and an external portion of silicon carbide. The protective layer is preferably formed prior to complete densification of the composite material, typically after the step of consolidating the fibrous reinforcement, i.e. after partial densification has been performed which is just sufficient to bind the reinforcing fibers together. The thickness of each portion of the protective layer lies in the range 0.5 microns to 5 microns.

In Patent Application EP-0 176 055 (inventors Holzl, et al.), a carbon body (which may be a C/C composite) is protected against oxidation by initially chemically etching the carbon body with a boron oxide to form interstices which extend to a determined depth and which occupy about one-half of the initial volume of the carbon body down to that depth. The pores created in this way are filled by inserting silicon or a silicon alloy, thereby giving rise by reaction to a layer constituted by silicon boride and by silicon carbide in substantially equal parts. An additional surface coating, e.g. of silicon carbide, is formed with or without an intermediate layer of boron or of a boron compound. The carbon body treated in this way exhibits very good resistance to oxidation in air at a temperature of about 1370° C.

An object of the present invention is to provide a method giving increased protection against oxidation to composite materials containing carbon at operating temperatures that may reach at least 1500° C.

SUMMARY OF THE INVENTION

This object is achieved by a method comprising forming, on the composite material, an inner layer, an intermediate layer containing boron or a boron compound, and an outer layer of silicon carbide, in which method, according to the invention, the inner layer deposited on the composite material before the intermediate layer is formed, is made of a refractory carbide that does not contain boron and that is at least 60 microns thick, said inner layer insulating the intermediate layer from the carbon contained in the composite material.

Thus, unlike the state of the art outlined above, the inner layer of the anti-oxidation protective coating does not contain boron.

This inner layer of refractory carbide, e.g. silicon carbide, zirconium carbide, or hafnium carbide, constitutes an additional barrier against oxygen. However its main function is to prevent the carbon contained in the composite material from reacting with the borate or boro-silicate type glass formed with the boron in the intermediate layer, and to prevent outwards diffusion of the gaseous species given off by the carbon oxidizing. For a similar reason, the method of the invention is more particularly intended to provide anti-oxidation protection for composite materials that do not include boron around the fibers or within the matrix, regardless of whether the boron is in the form of the element, of carbon boride, or of silicon boride optionally allied with one another or with other substances, and with the exception of boron nitride which may be formed in the interface between the fibers and the matrix.

The boron-containing intermediate layer may be constituted by elemental boron or by a boron compound, such as boron carbide, for example.

Advantageously, the inner, intermediate, and outer layers are formed by chemical vapor deposition. The anti-oxidation treatment can thus be performed in the same enclosure and in a single operation, while using an appropriate support for the parts to be coated, and while varying the composition of the gas and of other parameters (temperature, pressure) to obtain the desired deposit.

The invention also provides a composite material containing carbon and protected against oxidation by a method as defined above.

BRIEF DESCRIPTION OF THE DRAWINGS

Implementations of the invention are described by way of example with reference to the accompanying drawings, in which.

DETAILED DESCRIPTION OF THE PREFERRED EMBODIMENTS

In the examples given below, the composite materials that are provided with anti-oxidation protection are of the two-dimensional (2D) type or of the three-dimensional (3D) type, being made of carbon/carbon (C/C) or of carbon/silicon carbide (C/SiC: a reinforcing fibrous texture made of carbon fibers and densified by a matrix made essentially of silicon carbide).

A 2D composite material is a material in which the reinforcing fibers form a two-dimensional system. The reinforcing texture is constituted by cloth or sheets of threads or cables, optionally disposed in a plurality of superposed layers.

A 3D composite material is a material in which the reinforcing fibers form a three-dimensional system. The reinforcing texture is obtained, for example, by three-dimensional weaving or by superposing and interconnecting two-dimensional plies of cloth, felt, sheets of threads or cables, . . . , with the connections between plies being made by needling, implanting threads, . . . .

Figure 1:
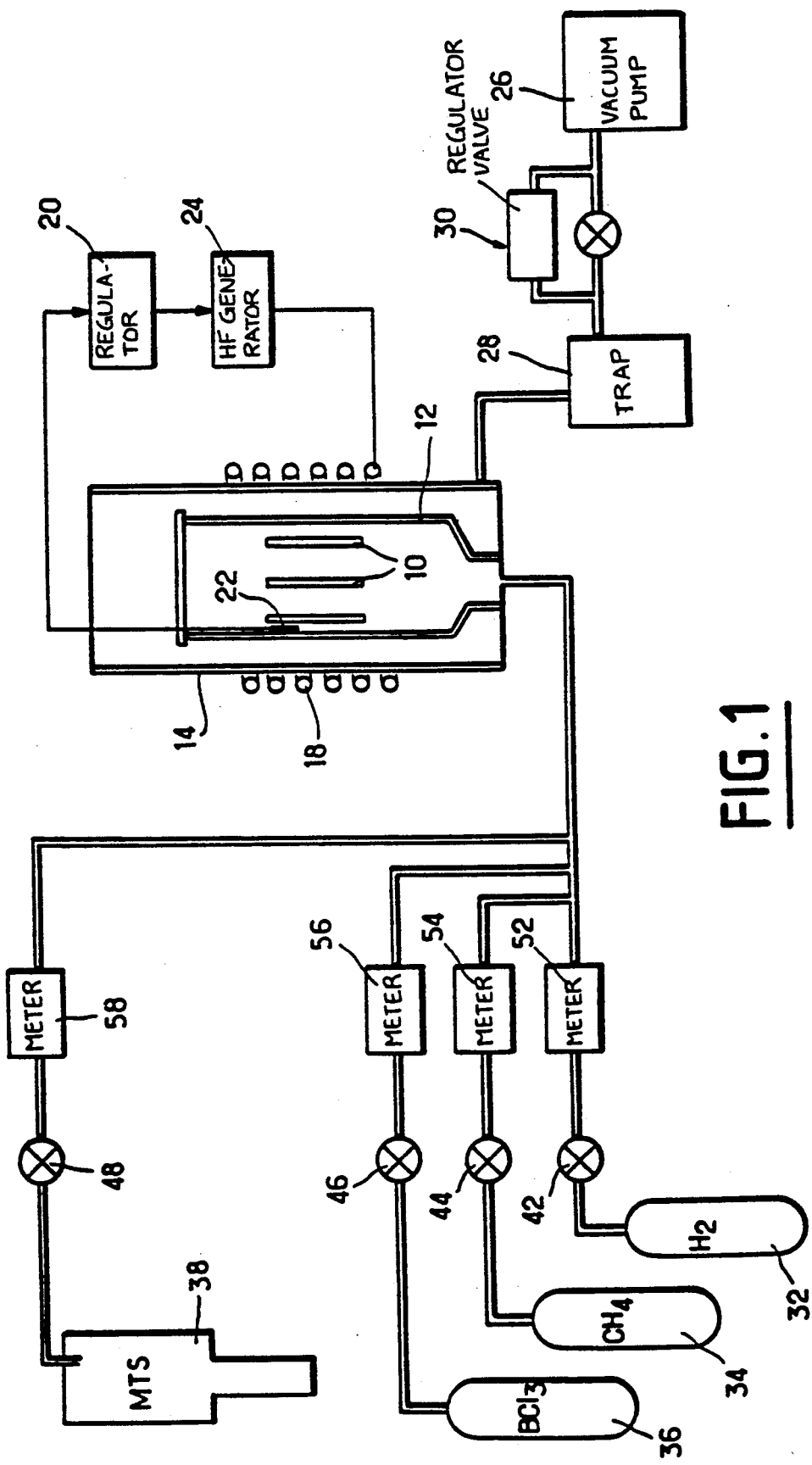
FIG. 1 shows an installation enabling anti-oxidation protective deposition to be performed in accordance with the invention.

In all of the examples the composite material is provided with antioxidation protection by a chemical vapor deposition process. To this end, an installation such as that shown in accompanying FIG. 1 is used.

Workpieces 10 made of composite material to be treated are placed in a graphite susceptor 12 inside a reactor 14. The workpieces 10 are held inside the reactor by means of an appropriate support device or by being suspended from threads or wires, e.g. of tungsten. The susceptor is heated by an inductor 18 disposed around the reactor 14.

A regulator circuit 20 receives a signal provided by a thermocouple 22 representative of the temperature inside the susceptor, and it controls a high frequency generator 24 which powers the inductor 18 so as to maintain the temperature inside the susceptor at a desired value.

The flow of gas giving the desired deposit on the workpieces 10 penetrates into the susceptor via its bottom end. Residual gas escapes from the top end of the susceptor, inside the reactor 14. The reactor is connected to a vacuum pump 26. A liquid nitrogen trap device 28 is disposed on the duct connecting the reactor to the vacuum pump in order to recover condensable substances. A regulator valve 30 upstream from the vacuum pump 26 serves to maintain the pressure inside the reactor and the susceptor 12 at a desired value.

Gas sources provide the ingredients for the flow of gas injected into the susceptor. A plurality of gas sources may be provided, e.g. four sources 32, 34, 36, and 38, which are used or not used depending on the gas flow composition that corresponds to the deposit to be formed. Each source is connected to the reactor by a pipe including a respective automatically-controlled stop cock 42, 44, 46, or 48, and a respective mass flow rate meter 52, 54, 56, or 58, with the meters enabling the relative proportions of the ingredients in the gas flow to be regulated.

In the examples that follow, deposits of the following substances are to be formed: silicon carbide (SiC), boron (B), and boron carbide ($B_4C$).

To this end, the sources 32, 34, 36, and 38 are respectively sources of hydrogen ($H_4$), methane ($CH_4$), boron chloride ($BCl_3$), and methyltrichlorosilane or MTS ($CH_3SiCl_3$), with the source of MTS being constituted by an evaporator.

An installation of the kind outlined above is well known. It is normally used as follows. After the workpieces 10 to be treated have been installed in the susceptor 12, the inside volume of the reactor 14 is evacuated and scavenged by hydrogen at the required pressure. Heating of the susceptor is started, and when the required temperature is reached, the gases making up the gas flow corresponding to the deposit to be formed are admitted into the susceptor, with the meters being set to the desired values. After a predetermined length of time corresponding to the desired thickness of the deposit, the admission of the gas flow is interrupted, heating is stopped, and the susceptor cools down under hydrogen scavenging. After returning to atmospheric pressure, the parts 10 coated with the desired deposit are removed from the reactor.

When several different superposed deposits are to be formed, as is the case when forming an anti-oxidation coating in accordance with the invention, these deposits may be formed without removing the workpieces between two deposition operations. When one deposit has been made, it suffices to interrupt the admission of gas flow, adjust the temperature and pressure under hydrogen scavenging to those corresponding to the following deposition operation, and once the required temperature and pressure have been reached, to admit the gas flow that corresponds to the new deposit to be formed.

EXAMPLE 1

Rectangular samples of 3D C/C composite having dimensions 20 mm × 10 mm × 3 mm are used. In conventional manner, these samples are formed by stacking and needling plies of rectangular carbon fiber cloth to form a reinforcing structure, and the reinforcing structure is densified by chemical vapor infiltration to form the carbon matrix.

The samples are provided with an anti-oxidation coating by chemical vapor deposition, successively of an inner layer of SiC, of an intermediate layer of $B_4C$, and of an outer layer of SiC.

The inner layer of SiC is obtained from a flow of gas constituted by a mixture of MTS and $H_2$, the temperature in the susceptor being 1050° C. and the pressure being 300 torr (about $4 \times 10^4$ N/m$^2$). The flow rates of MTS and of $H_2$ are in a ratio of about 1 to 10. Deposition is continued until the desired thickness is reached.

The intermediate layer of $B_4C$ is obtained from a gas flow constituted by a mixture of $CH_4$, $H_2$, and $BCl_3$, with the temperature and pressure being 975° C. and 300 torr (about $4 \times 10^4$ N/m$^2$). The proportions of the flow rates of $CH_4$, $H_2$, and $BCl_3$ are respectively about 1 to 12 and 1 to 3.2. Deposition is continued until the desired thickness is reached.

The outer layer of SiC is formed in the same way as the inner layer.

The effectiveness of the anti-oxidation protection is verified by subjecting the treated samples to oxidation cycles in air at high temperatures, and by measuring the relative change in mass dm/m of the samples, with a loss of mass indicating that carbon has been lost by oxidation.

Table I below gives the results obtained using samples coated with a 120 micron thick inner layer of SiC, a 10 micron thick intermediate layer of $B_4C$, and a 60 micron thick outer layer of SiC, subjected to different oxidation treatments. By way of comparison, the results obtained using a sample coated with a single layer of SiC are also given.

TABLE I

| Type of composite | Layer thicknesses of anti-oxidation coating (microns) | | | Oxidation treatment (temperature and duration) | Change in mass dm/m (%) |
|---|---|---|---|---|---|
| | Inner SiC | $B_4C$ | Outer SiC | | |
| 3D C/C | 120 | — | — | 1300° C. - 60h +1500° C. - 60h | −7 |
| 3D C/C | 120 | 10 | 60 | 1300° C. - 60h +1500° C. - 60h | −0.08 |
| 3D C/C | 120 | 10 | 60 | 1500° C. - 30h | −0.01 |
| 3D C/C | 120 | 10 | 60 | 1500° C. - 120h | −0.9 |

Figure 2:
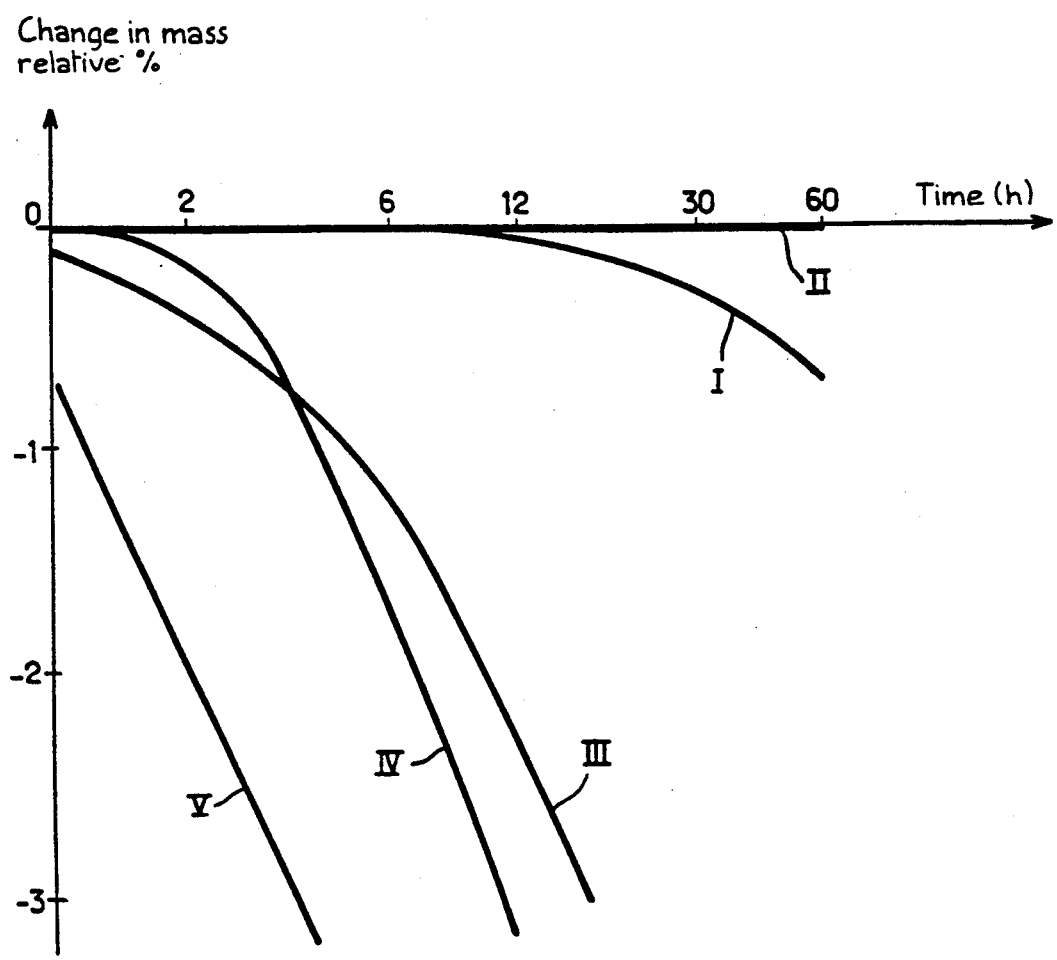
FIGS. 2 to 6 are graphs showing the variation in mass loss as a function of the duration of oxidation treatment for workpieces made of composite material and provided with anti-oxidation protection in accordance with the invention and for workpieces made of composite material and provided with prior art anti-oxidation protection.

The curves in FIG. 2 show relative mass change as a function of time during oxidation treatment in air at 850° C. The oxidation treatment is performed cyclically with temperature rising to 850° C. followed by cooling to ambient temperature once per hour for the first six hours, and then once every six hours until the end of the first 60 hours, with oxidation then being continued isothermally. Curve I relates to a sample coated with a 120 micron thick inner layer of SiC, a 10 micron thick intermediate layer of $B_4C$, and a 60 micron thick outer layer of SiC. Curve II shows the results of similar measurements of relative mass change for a sample coated with a 120 micron thick inner layer of SiC, a 40 micron thick intermediate layer of $B_4C$, and a 60 micron thick outer layer of SiC. Curve III shows the results of similar measurements for a sample coated with a 60 micron thick inner layer of SiC, a 10 micron thick intermediate layer of $B_4C$, and a 60 micron thick outer layer of SiC. By way of comparison, curves IV and V in FIG. 2 show the results of the same measurements performed on similar 3D C/C samples coated with prior art anti-oxidation protection, constituted by a layer of $B_4C$ which is respectively 60 microns thick or 20 microns thick, covered by an outer layer of SiC which is respectively 60 microns thick or 80 microns thick.

Figure 3:
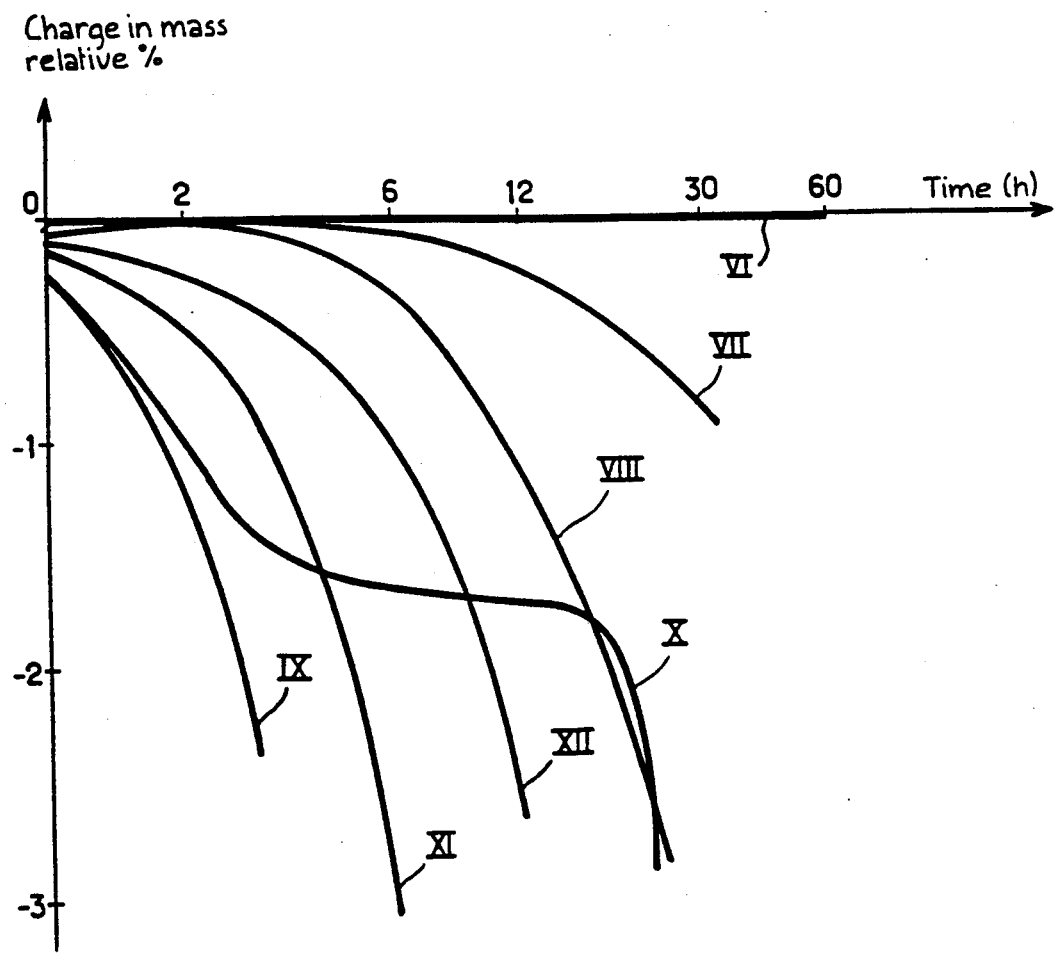

Curves VI to XII in FIG. 3 show the change in relative mass as a function of time for cyclic oxidation treatment in air at 1300° C. on 3D C/C composite samples provided with anti-oxidation coatings. The compositions of these coatings are given below in Table II for the various samples corresponding to the different curves.

TABLE II

| | Thickness of inner SiC layer (microns) | Thickness of intermediate $B_4C$ layer (microns) | Thickness of outer SiC layer (microns) |
|---|---|---|---|
| curve VI | 120 | 10 | 60 |
| curve VII | 120 | 5 | 30 |
| curve VIII | 60 | 10 | 60 |
| curve IX | 30 | 5 | 30 |
| curve X | 0 | 60 | 60 |
| curve XI | 0 | 20 | 80 |
| curve XII | 120 | 0 | 0 |

Figure 4:
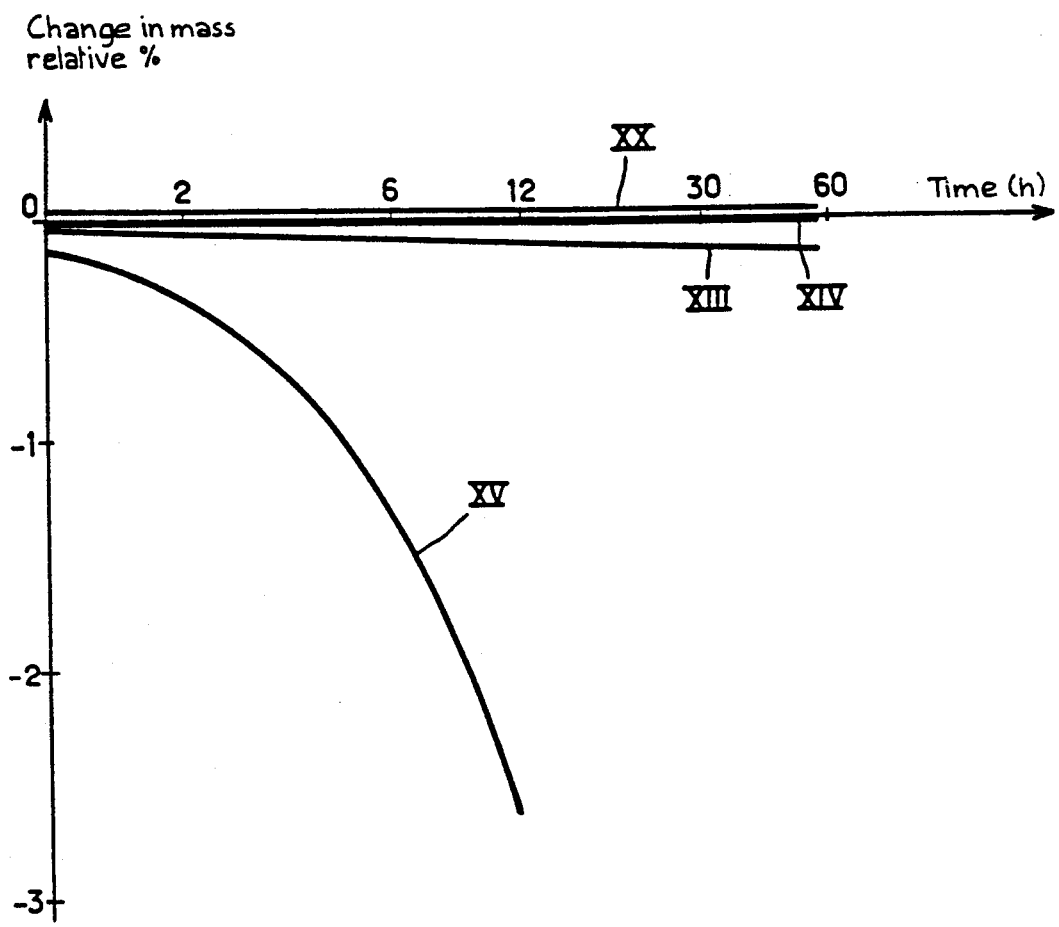

Curves XIII, XIV, and XV of FIG. 4 show the change in relative mass as a function of time for cyclic oxidation treatment in air at 1500° C., still for 3D C/C composite samples and provided with the following anti-oxidation coatings respectively:

for curve XIII, a 120 micron thick inner layer of SiC, a 10 micron thick intermediate layer of $B_4C$, and a 60 micron thick outer layer of SiC;

for curve XIV, a 120 micron thick inner layer of SiC, a 40 micron thick intermediate layer of $B_4C$, and a 60 micron thick outer layer of SiC; and for curve XV, a single 160 micron thick layer of SiC.

Table I and the curves in FIGS. 2 to 4 show the excellent oxidation behavior of samples protected in accordance with the invention (low mass losses).

The same conclusion is reached on comparing curves VI, VII, and VIII with curves X and XI.

Curves III and VIII seem to indicate that the inner layer of SiC does not begin to perform its function until it is at least 60 microns thick. From curves I, II, VI, and VIII and for longer periods of oxidation it would even appear preferable to have a minimum thickness greater than 60 microns, about 120 microns. Curve IX shows that a 30 micron thick inner layer of SiC does not produce good results.

Curves XII and XV which correspond to a prior art protective coating constituted by a single 120 micron thick SiC layer exhibit results that are nothing like as good as those obtained with the SiC—$B_4C$—SiC combination of the invention.

Figure 5:
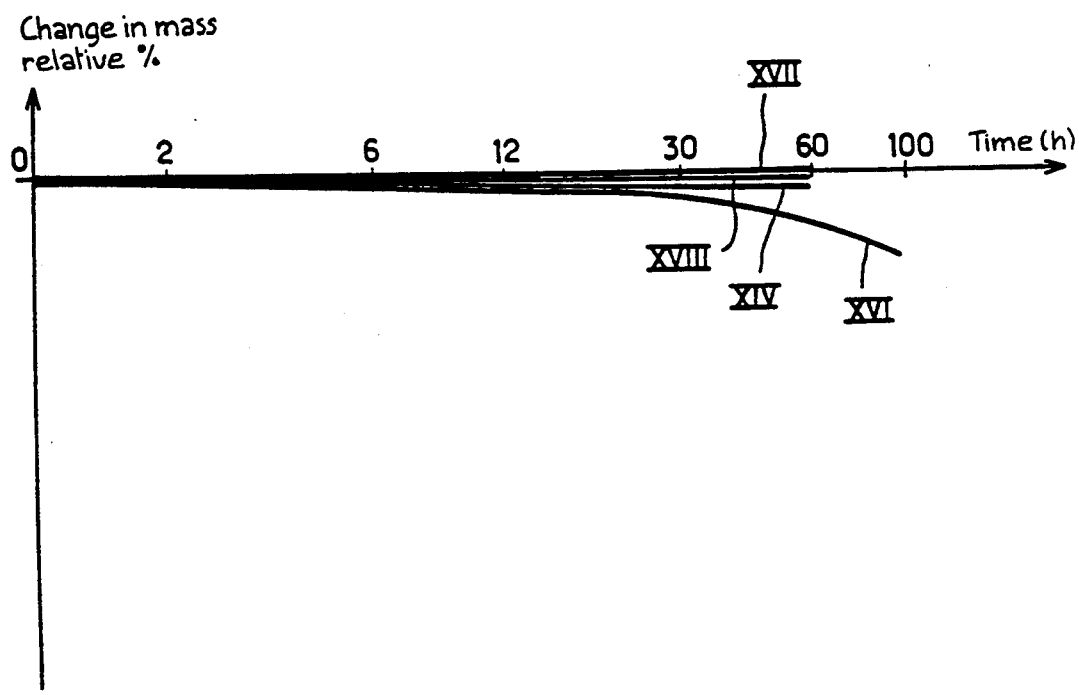

It may also be observed that the method of the invention provides effective anti-oxidation protection at various different temperatures. This can be seen in FIG. 5 where curves XVI to XIX show the results obtained during cyclic oxidation treatment in air respectively at 450° C., 850° C., 1300° C., and 1500° C. on the above-specified 3D C/C composite samples protected with a coating formed by a 120 micron thick inner layer of SiC, a 40 micron thick intermediate layer of $B_4C$, and a 60 micron thick outer layer of SiC (with curves XVII and XIX being identical to curves II and XIV, respectively).

EXAMPLE 2

Cylindrical samples of 3D C/C composite having a diameter of 25 mm and a thickness of 5 mm are used, which samples are obtained by densification using chemical carbon vapor infiltration within a reinforcing texture constituted by plies of carbon cloth in the form of disks that are stacked and needled.

The samples are provided with anti-oxidation protection as in Example 1, with the thicknesses of the inner SiC layer, the $B_4C$ layer, and the outer SiC layer being respectively 120 microns, 10 microns, and 60 microns.

After cyclic oxidation treatment in air at 1300° C. for 60 hours and then at 1500° C. for 60 hours, the measured relative mass loss is only 0.9%.

EXAMPLE 3

2D C/SiC composite samples in the form of rectangles having the dimensions 20 mm×10 mm×2 mm are used. These samples are obtained by forming a 2D fibrous texture of carbon (stacking several plies of carbon cloth), and then by densification by chemical vapor infiltration of SiC.

The samples are provided with anti-oxidation protection as in Example 1. Table III below shows the results obtained after cyclic oxidation treatment of the samples and for different thicknesses of the protective layers. By way of comparison, a test was performed on a sample provided with an anti-oxidation coating constituted by a single 185 micron thick layer of SiC on the faces of the sample and by 50 micron thick layers of SiC on the edges thereof.

TABLE III

| Type of composite | Layer thicknesses of anti-oxidation coating (microns) | | | Oxidation treatment (temperature and duration) | Change in mass dm/m (%) |
|---|---|---|---|---|---|
| | Inner SiC | $B_4C$ | Outer SiC | | |
| 2D C/SiC | 240 | 10 | 60 | 1300° C. - 60h +1500°C. - 60h | −1.2 |
| 2D C/SiC | 120 | 5 | 40 | 1300° C. - 60h | −0.3 |
| 2D C/SiC | 185 (faces) 50 (edges) | 0 | 0 | 1500° C. - 30h | −32 |

The thickness given for the inner SiC layer is the total thickness of SiC deposited on the outside of the plies of carbon cloth.

The results obtained with the SiC—$B_4C$—SiC coating are substantially of the same order as those obtained on the C/C composite, and they are considerably better than the result obtained using a single SiC coating.

EXAMPLE 4

Cylindrical 2D C/SiC composite samples are used having a diameter of 25 mm and a thickness of 2.5 mm, obtained by stacking disks of carbon cloth, and then by chemical SiC vapor infiltration. The samples are provided with an anti-oxidation protective coating as in Example 1. Table IV below shows the results obtained after cyclic oxidation treatment for different thicknesses of the protective layers.

TABLE IV

| Type of composite | Layer thicknesses of anti-oxidation coating (microns) | | | Oxidation treatment (temperature and duration) | Change in mass dm/m (%) |
|---|---|---|---|---|---|
| | Inner SiC | $B_4C$ | Outer SiC | | |
| 2D C/SiC | 180 | 10 | 60 | 1300° C. - 65h +1500° C. - 40h | −0.2 |
| 2D C/SiC | 120 | 10 | 60 | 1300° C. - 40h +1500° C. - 65h | −0.5 |

The results are of the same order as those obtained using 3D C/C samples. It may again be observed that the thickness of the inner SiC layer is the total thickness of SiC deposited on the outside of the plies of carbon cloth.

EXAMPLE 5

3D C/C composite samples are used that are identical to those of Example 1.

The samples are provided with an anti-oxidation coating obtained by chemical vapor deposition of the following layers in succession: an inner SiC layer, an intermediate B layer, and an outer SiC layer.

The SiC layers are formed as in Example 1.

The intermediate B layer is obtained from a flow of gas constituted by a mixture of $BCl_3$ and $H_2$, with the temperature in the susceptor being 950° C. and the pressure being 300 torr (about $4\times10^4$ N/m²). The ratio of the flow rates of $BC_3$ and $H_2$ is about 1 to 22. Deposition is continued until the desired thickness is reached.

The following Table V gives the results of cyclic oxidation tests obtained for different thicknesses of the protective layers.

TABLE V

| Type of composite | Layer thicknesses of anti-oxidation coating (microns) | | | Oxidation treatment (temperature and duration) | Change in mass dm/m (%) |
|---|---|---|---|---|---|
| | Inner SiC | B | Outer SiC | | |
| 3D C/C | 120 | 8 | 60 | 1300° C. - 60h +1500° C. - 60h | +0.03 |
| 3D C/C | 120 | 8 | 60 | 80 MPa prestress* on one face then 1300° C. - 7h and +1500° C. - 40h | −0.12 |
| 3D C/C | 120 | 4 | 30 | 1300° C. - 60h +1500° C. - 30h | +0.05 |
| 3D C/C | 120 | 4 | 30 | 80 MPa prestress* on one face then 1300° C. - 7h and 1500° C. - 40h | −0.20 |

*The prestress is achieved by 3-point bending on close-together supports: two support points on the lower face with force being exerted on the middle of the upper face between the two support points.

The table shows that excellent results are obtained by the method of the invention. The small positive changes in mass may be explained by SiC and B being oxidized respectively to $SiO_2$ and $B_2O_3$.

Curve XX in FIG. 4 shows the change in mass as a function of time during cyclic oxidation treatment at 1500° C. performed on a 3D C/C composite sample provided with a coating constituted by: a 120 micron thick inner SiC layer, an 8 micron thick intermediate B layer, and a 60 micron thick outer SiC layer. It can be seen that the material has excellent performance.

Figure 6:
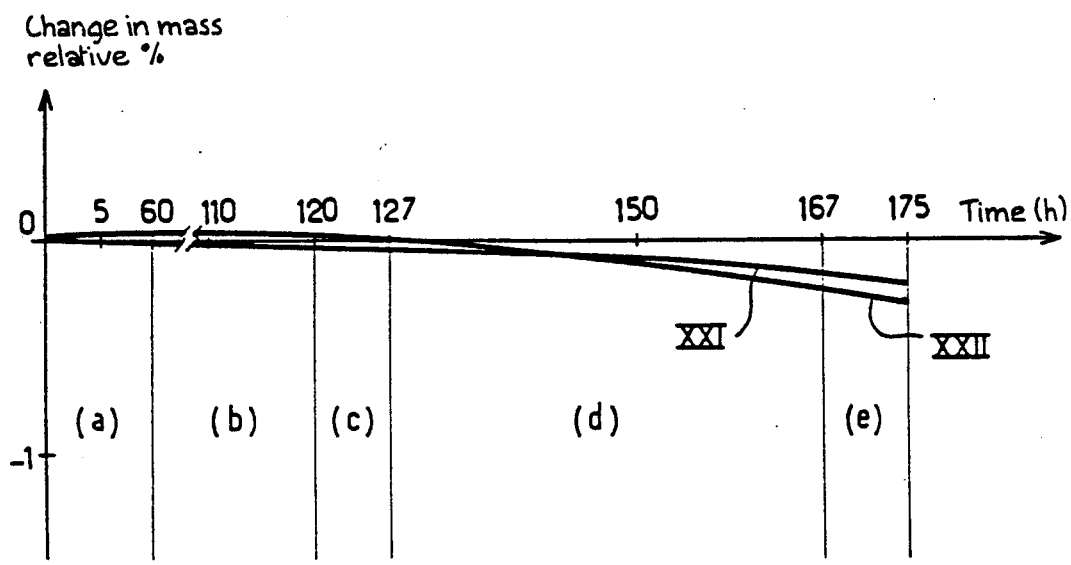

Curves XXI and XXII in FIG. 6 show mass loss as a function of time by treatment performed on 3D C/C composite samples provided with the following coatings respectively: 120 micron inner SiC-8 micron B-60 micron outer SiC; and 120 micron inner SiC-4 micron B-30 micron outer SiC. The treatment performed comprises the following five stages respectively: (a) isothermal oxidation at 1300° C. for 60 hours, (b) isothermal oxidation at 1500° C. for 60 hours, (c) isothermal oxidation at 1300° C. for 7 hours after 80 MPa prestressing on one face (3-point bending), (d) isothermal oxidation at 1500° C. for 40 hours, and (e) isothermal oxidation at 1500° C. for 8 hours after prestressing at 80 MPa on the other face of the sample. This prestress amounts to about 35% of the initial stress to rupture of the material.

Curves XXI and XXII demonstrate the excellent protection imparted by the SiC-B-SiC combination, up to 1500° C. in spite of the crack-generating prestressing.

EXAMPLE 6

Rectangular 2D C/SiC composite samples identical to those of Example 3 are used here. These samples are provided with SiC-B-SiC protection as in Example 5. Table VI shows the result of cyclic oxidation tests obtained for different thicknesses of the protective layers.

TABLE VI

| Type of composite | Layer thicknesses of anti-oxidation coating (microns) | | | Oxidation treatment (temperature and duration) | Change in mass dm/m (%) |
|---|---|---|---|---|---|
| | Inner SiC | B | Outer SiC | | |
| 2D C/SiC | 155 | 4 | 20 | 1300° C. - 60h +1500° C. - 60h | −0.35 |
| 2D C/SiC | 180 | 8 | 60 | 1300° C. - 60h +1500° C. - 60h | −0.4 |
| 2D C/SiC | 180 | 8 | 60 | Prestress* 150 MPa on one face +1500° C. - 8h | −0.6 |
| 2D C/SiC | 240 | 8 | 60 | 1300° C. - 60h | −0.10 |

TABLE VI-continued

| Type of composite | Layer thicknesses of anti-oxidation coating (microns) | | | Oxidation treatment (temperature and duration) | Change in mass dm/m (%) |
|---|---|---|---|---|---|
| | Inner SiC | B | Outer SiC | | |
| | | | | +1500° C. - 120h | |

*3-point bending prestress.

The results obtained using an intermediate layer of B appear to be slightly better than those obtained using an intermediate layer of $B_4C$.

In the examples given above, the composite materials used are of the 3D C/C type and of the 2D C/SiC type. Naturally, the method of the invention is not limited to the particular composite materials. It applies to any composite containing carbon, in particular C/C type composites, C/ceramic type composites, and ceramic/ceramic type composites, in which the reinforcing texture is either of the 2D type of the 3D type.

We claim:

1. A composite material containing carbon and provided with an anti-oxidation protective coating, the coating comprising:
   an outer layer of silicon carbide,
   an intermediate layer containing boron or a boron compound, and
   an inner layer comprised of a refractory carbide that does not contain boron and that is at least 60 microns thick, the inner layer insulating the intermediate layer containing boron or a compound of boron from the carbon contained in the composite material.

2. The composite material according to claim 1, wherein the inner layer is a carbide selected from silicon carbide, zirconium carbide, and hafnium carbide.

3. The composite material according to claim 1, wherein the intermediate layer is comprised of a material selected from boron carbide and elemental boron.

4. The composite material according to claim 1, wherein the intermediate layer consists essentially of boron or a compound of boron.

* * * * *